G. SAYRE.
DYNAMO ELECTRIC MACHINE.
APPLICATION FILED MAY 16, 1912.
1,077,942.
Patented Nov. 4, 1913.
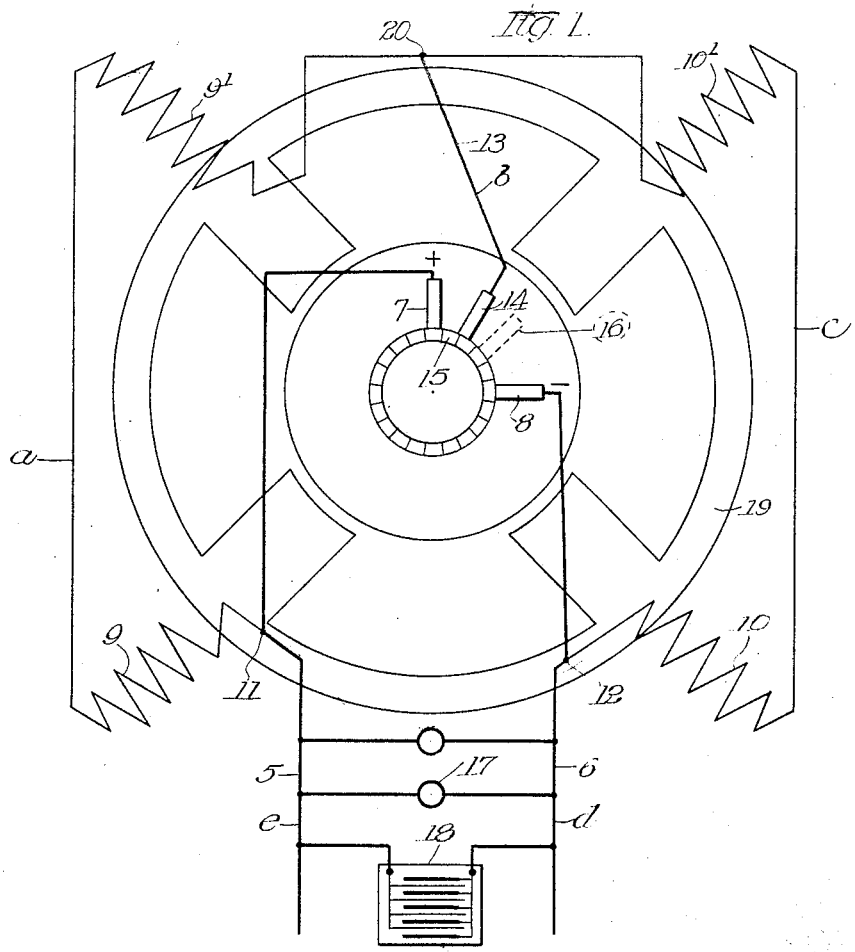
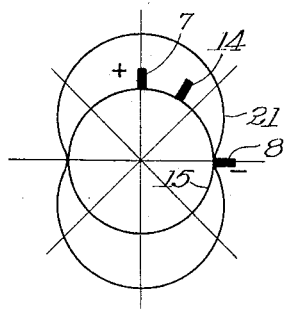
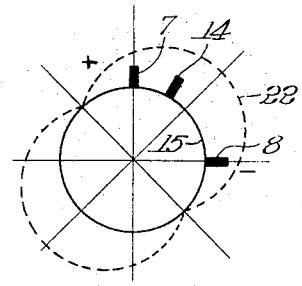
Witnesses:
Robert F. Weir
Arthur W. Carlson
Inventor
Gorden Sayre
by Foree Bain May
Attys

UNITED STATES PATENT OFFICE.

GORDON SAYRE, OF DAYTON, OHIO, ASSIGNOR TO THE APPLE ELECTRIC COMPANY, OF DAYTON, OHIO, A CORPORATION OF OHIO.

DYNAMO-ELECTRIC MACHINE.

1,077,942.     Specification of Letters Patent.     Patented Nov. 4, 1913.

Application filed May 16, 1912. Serial No. 697,591.

*To all whom it may concern:*

Be it known that I, GORDON SAYRE, a citizen of the United States, residing at Dayton, in the county of Montgomery and State of Ohio, have invented certain new and useful Improvements in Dynamo-Electric Machines, of which the following is a specification.

My invention relates to improvements in constant current regulating dynamo electric machines.

One of the objects of my invention is to provide a self regulating constant current electric machine, which will maintain practically constant its own current output under large variations of speed.

Another object of my invention is to provide a regulator of the character described, which is an inherent part of the machine structure, and which is entirely devoid of any automatically moving or complicated parts or windings.

Other and further objects of my invention will become readily apparent to persons skilled in the art from a consideration of the following description, taken in conjunction with the drawings which are a part hereof wherein:

Figure 1 is a schematic arrangement of the circuits, diagrammatically represented. Fig. 2 shows diagrammatically the normal distribution of electro-motive-force around the commutator, with the brushes on the commutating points of a four pole dynamo electric machine, having a cross connected armature. Fig. 3 shows a similar view, with the commutating points and the points of maximum and minimum potential very much displaced relatively to each other, due to the reaction of the armature.

In all of the views the same reference characters are used to indicate similar parts.

My regulator is especially adapted for use in lighting vehicles and for igniting and starting the engines of vehicles, such as automobiles, motor boats and the like; for train lighting systems wherein the dynamo is driven from the axle and its speed is directly determined by the speed of same. It is also adapted for use with storage batteries wherewith the battery may be floated on the line without fear of reversal of the dynamo electric machine, as when series wound field magnets are used in connection therewith.

In the foregoing situations, where dynamo electric machines are used with variable speed vehicles, it is highly essential that the machine shall generate current of sufficient volume, at relatively slow speed, and that any increase of speed cannot operate to proportionately increase the strength of the current, for otherwise the current would increase proportionately to the increase of speed and the translating devices connected with the circuits, such as lamps, induction coils and other such current responsive devices or instrumentalities, would be overloaded, resulting in the burning out of such devices and the dangerous over-loading and heating of the field magnets and armature of such dynamo-electric machines.

My present system of regulation has been operating to my entire satisfaction on small installations that are required for lighting automobiles and for furnishing current for producing the spark for the internal combustion engine used to operate such vehicles, the electromotive force in such installations not having exceeded 12 to 15 volts and the current having been maintained at any point within the normal range of speed from 1200 to 3000 R. P. M. at 8 to 10 amperes.

In Fig. 1, 5 and 6 represent the mains of an electric working circuit for distribution of the current, generated by my dynamo electric machine, provided with my constant current regulator. The main 5 is connected to the positive brush 7 and the main 6 is connected to the negative brush 8 as usual in quadrupolar dynamos, of which the diagram represents one of the type. The shunt field winding is composed of the coils 9, 9' and 10, 10' connected in series, the terminals being connected with their respective mains as at 11 and 12. This feature is substantially common in shunt wound dynamos. At a point between the coils 9' and 10' a wire 13 is connected to the intermediate regulating brush 14. The main brushes, 7, 8, and the auxiliary regulating brush 14 bear on the commutator 15.

The brush 14, is shown in dotted lines, as at 16, to indicate the range of movement of the brush 14 as a means determining the strength of the current that is to be automatically maintained in the mains 5 and 6. It is only necessary to move the brush 14, and fix it in selected position, when the current is to be increased, or decreased, as the case may be. If it is desirable that 10 amperes be maintained in the main circuit, between the mains 5 and 6, under varying changes of speed, then the brush should occupy approximately a position shown in full lines but if the strength of the current to be maintained constant in the mains, is to be of less value, say 6 or 8 amperes, then the regulating brush 14, should be moved forward in the direction toward the dotted line position.

17 shows incandescent lamps connected to the mains 5 and 6 and 18 is a storage battery connected to said mains. Switches may be employed to open the main circuit, between the battery and the dynamo, but such switches not being of present interest, I have made the circuits as simple as possible for the purpose of more clearly explaining my particular system of regulation and its operation.

In the field magnet frame of the dynamo electric machine it is assumed that the windings 9 and 9', 10 and 10' surround the salient poles of the magnets. The circuit through the field winding is from the point 11, through the coils 9 and 9' to the point 20, where the intermediate brush 14 is connected at the junction of the coils 9' and 10', this part of the circuit I have called circuit $a$. From the brush 14 to the point 12, through the coils 10' and 10 I have called circuit $b$. The circuit through the coils 10 and 10' I have called circuit $c$ and the circuit between the mains 5 and 6 I have called circuit $e—d$.

The operation of my regulating dynamo is as follows: The dynamo, being directly connected to the engine, begins to generate appreciable current when the armature thereof is rotated at the rate of about 600 R. P. M. and the current rises rapidly until a speed of 1200 is attained when the current has arrived at its maximum value of $9\frac{1}{2}$ to 10 amperes. It is now desirable to maintain the current, in the main circuit, at a point not greater than $9\frac{1}{2}$ amperes at speeds varying from 1200 to 3000. When the current has reached its normal value at which it is to be maintained constant or $9\frac{1}{2}$ amperes, at a speed of 1200 R. P. M., the current through the circuit $a$ or the coils 9 and 9' will have decreased from $1\frac{1}{4}$ amperes to a little less than $\frac{1}{2}$ ampere, and the current flowing from the auxiliary regulating brush 14 through circuit $b$ will have increased from 0 to $1\frac{3}{4}$ amperes. When the speed of the dynamo has reached 1500 revolutions the current passes through the coils 9 and 9' in a reverse direction from brush 14 to the brush 7, until the current flowing through this path reaches about three quarters amperes when the dynamo is running 3000 R. P. M. This effect is produced, in my opinion, by the shifting of the commutating point, due to the reaction of the armature, as diagrammatically shown in Figs. 2 and 3.

In Fig. 2 the full line 21 represents the distribution of the electro-motive-force around the commutator 15, when there is no distortion of the field flux by the reactive effect, produced by the armature, due to the tendency of increased current in the armature. In this condition it will be noted that there is very little difference of potential between the brushes 14 and 7 and that current will flow from brush 7 to brush 8 and from brush 14 to brush 8. If the ideal commutating points be circumferentially displaced from the points at which the brushes bear upon the commutator, by distortion of the field due to the reaction of the armature upon the field magnets, as shown by dotted line in Fig. 3, it will then be observed that there is considerable fall of potential, in reverse direction, from brush 14 to brush 7 and that is accompanied by the reversal of the current through the coils 9 and 9' after the machine has reached a speed of 1500 R. P. M.

Referring to Fig. 3; if the regulating brush 14 be set ahead, as shown in dotted lines in Fig. 1 this effect will be increased so that a greater reverse current will flow through this circuit $a$ and more greatly reduce the current flowing in the circuit $e—d$, or the main circuit, when the current will then be maintained, substantially constant, between $7\frac{1}{2}$ and 8 amperes.

I have given the best explanation, and theory of operation, that I know, and whether or not my theory be correct, the fact remains that the actual operation of this device is substantially as shown, and throughout a range of speed of the armature from 1200 to 3000 R. P. M. and that the current remains substantially constant, without the necessity of mechanically moving any part of the dynamo, for the purpose of accomplishing the automatic regulation.

I am fully aware that a third intermediate or auxiliary brush has been used for purposes of regulation, as a means for maintaining constant potential in shunt wound dynamos, or constant current in series wound dynamos, but in such prior devices the automatic movement of the auxiliary brush, over the surface of the commutator, was essential for accomplishing the regulation, but I am not aware that a shunt wound dynamo has heretofore been used wherein regulation was accomplished, in the manner described, without the necessity of moving the brush for maintaining a constant current in the mains, in such a manner, and wherein the value of the current to be maintained constant could be changed by the movement of the regulating brush to a greater or less distance from a given main brush, and then fixed.

While I have herein described in some detail a specific embodiment of my invention and have given my ideas regarding the theory of operation involved, I do not desire to be limited to or bound by any statement regarding such opinion further than defined by the appended claims.

1. A constant current, self regulating dynamo-electric machine having an armature and two main brushes bearing on the commutator thereof at commutating points for a practically, undistorted field, for connection to the mains of a working circuit, and an auxiliary regulating brush fixed relatively to the main brushes during the normal operation of the machine, bearing on said commutator, at an intermediate point between said main brushes; shunt windings for field magnets of said dynamo having their terminals connected to said main brushes, and a connection between said auxiliary regulating brush and an intermediate point in said field winding whereby to maintain constant current, in said main circuit, under varying speed of said armature.

2. A constant current, self regulating dynamo-electric machine having an armature and two main brushes bearing on the commutator thereof at commutating points for a practically, undistorted field, for connection to the mains of a working circuit, a normally fixed auxiliary, regulating brush capable of adjustment and to be fixed to bear on the commutator at any selected point between said main brushes, shunt windings for field magnets of said dynamo, having their terminals connected to said main brushes and a connection between said auxiliary regulating brush and an intermediate point in said field windings whereby the fixed location of said auxiliary brush will control the value of the current that will be constantly delivered in the mains.

In testimony whereof I hereunto set my hand in the presence of two witnesses.

GORDON SAYRE.

In the presence of—
V. T. APPLE,
E. V. MARTIN.